(12) United States Patent
Ghali (10) Patent No.: US 7,107,215 B2
(45) Date of Patent: Sep. 12, 2006

(54) DETERMINING A COMPACT MODEL TO TRANSCRIBE THE ARABIC LANGUAGE ACOUSTICALLY IN A WELL DEFINED BASIC PHONETIC STUDY

(75) Inventor: Mikhail E. Ghali, Cairo (EG)

(73) Assignee: Sakhr Software Company, Cairo (EG)

( * ) Notice: Subject to any disclaimer, the term of this patent is extended or adjusted under 35 U.S.C. 154(b) by 731 days.

(21) Appl. No.: 09/835,535

(22) Filed: Apr. 16, 2001

(65) Prior Publication Data
US 2003/0040909 A1 Feb. 27, 2003

(51) Int. Cl.
*G10L 15/18* (2006.01)
(52) U.S. Cl. ...................................... 704/257
(58) Field of Classification Search ............... 704/235, 704/251, 259, 260
See application file for complete search history.

(56) References Cited

U.S. PATENT DOCUMENTS

| | | | | |
|---|---|---|---|---|
| 5,758,023 | A | * | 5/1998 | Bordeaux .................... 704/232 |
| 5,930,754 | A | * | 7/1999 | Karaali et al. .............. 704/259 |
| 5,933,804 | A | * | 8/1999 | Huang et al. ............... 704/244 |
| 5,953,701 | A | | 9/1999 | Neti et al. |
| 6,016,470 | A | | 1/2000 | Shu |
| 6,347,298 | B1 | * | 2/2002 | Vitale et al. ................ 704/260 |
| 6,363,342 | B1 | * | 3/2002 | Shaw et al. ................. 704/220 |
| 6,434,521 | B1 | * | 8/2002 | Barnard ...................... 704/244 |
| 6,490,557 | B1 | * | 12/2002 | Jeppesen .................... 704/235 |
| 6,546,369 | B1 | * | 4/2003 | Buth et al. .................. 704/275 |
| 6,738,738 | B1 | * | 5/2004 | Henton ......................... 704/2 |
| 2002/0143543 | A1 | * | 10/2002 | Sirivara ...................... 704/260 |

OTHER PUBLICATIONS

Selouni, S. etal., Recognition of Arabic Phonetic Features Using Neural Networks and Knowledge Based System: å Comparative Study, IEEE 404-411 (1998).

Shultz, T., et al., "Multilingual and Crosslingual Speech Recognition", Proceedings of the DARPA Broadcast News Transcription and Understanding Workshop 1-4 (1998).

Mouri-Beji, F., "A Statistical Model for an Automatic Procedure to Comprss a Word Transcription Dictionary", Proceedings, Advances in Pattern Recognition, 1037-1044 (1998).

* cited by examiner

*Primary Examiner*—Susan McFadden
*Assistant Examiner*—Jakieda R. Jackson
(74) *Attorney, Agent, or Firm*—Jones Day (57) ABSTRACT

In the development of an automatic speech recognition (ASR) system, an extensive study of the basic phonetic alphabet is performed to collect information regarding phonology and phonetics of the language or dialect in question (modern standard Arabic or MSA in this case). In addition, terminological and transcriptional problems are identified with respect to the language or dialect in question. Next, based on feature description (rather than symbol shapes), the symbols in the literature are mapped to a single or more recent phonetic alphabet. Lastly, from a maximal set containing all the phonemes, allophones, and transliteration symbols, a reduced set is created with a compact set of phonetic alphabets. Memory consumption is greatly reduced in a computer system by using this compact set of phonetic alphabets.

18 Claims, 7 Drawing Sheets

DETERMINING A COMPACT MODEL TO TRANSCRIBE THE ARABIC LANGUAGE ACOUSTICALLY IN A WELL DEFINED BASIC PHONETIC STUDY

FIELD OF INVENTION

The present invention relates generally to the field of controlling a computer dictation application using multi-gender human voice instead of a keyboard. More specifically, the present invention is related to determining a compact model to transcribe the Arabic language acoustically in a well-defined basic phonetic study.

BACKGROUND OF THE INVENTION

Phonetics, as defined by the Merriam-Webster® dictionary (Collegiate 10th ed.), is a system of speech sounds of a language or group of languages, and further comprises the study and systematic classification of the sounds made in spoken utterance. Hence, the phonetic system represents the practical application of this science to language study. An important part of phonetics is phonemes.

Phonemes, as defined by Merriam-Webster® dictionary (Collegiate 10th ed.), are abstract units of the phonetics system (associated with a particular language) that correspond to a group of speech sounds. For example, velar |k| of cool and the palatal |k| of keel are distinct sounds in the English language and are part of a set similar speech sounds. Another term related to Phonemes is allophones.

Allophone, as defined by Merriam-Webster® dictionary (Collegiate $10^{th}$ ed.), is one of two or more variants of the same phoneme. For example, the aspirated |p| of pin and the unaspirated |p| of spin are allophones of the phoneme |p|.

Orthography is another system associated with the sounds of a given language. Orthography, as defined by Merriam-Webster® dictionary (Collegiate $10^{th}$ ed.), is the representation of the sounds of a language by letters and diacritics. A diacritic is further defined as a mark near or through an orthographic or phonetic character or combination of characters indicating a phonetic value different from that given the unmarked or otherwise marked element. An example of a diacritic is the acute accents of résumé, which are added to the letter e to indicate a special phonetic value.

Additionally, some foreign languages often use diacritics to double the force of the phoneme, and they further use geminated graphemes. Graphemes are the set of units of a writing system (as letters and letter combinations) that represent a phoneme. Geminated graphemes are a sequence of identical speech sounds (as in meanness or Italian notte).

One of the advances in recent years is the impact of computers in the field of phonetics. One of the major challenges associated with human speech and computers is automatic speech recognition or ASR. ASR is defined as the ability of a computer-based system to recognize and decipher human voice. ASR systems are usually programmed to recognize a simple set of words that are common to a group of users, or sometimes ASR systems are programmed to recognize a complex set of words associated with a specific user.

One common problem associated with phonetic representation of foreign language (such as Arabic) is the abundance of phonetics associated with such languages. Arabic language displays a difference in orthography and phonetics associated with the language. This is best illustrated by the example of geminated graphemes. The feature of gemination is inherent in most Arabic phonetic alphabets, which is defined as doubling the force of the phoneme that is marked by a superscript sign. During editing, people do not write this sign unless it is crucially needed to decipher a certain meaning from another. That's why the grapheme is written only once. Another example is that the language exhibits different variations between the kinds of vowel distribution; either they are short or long vowels. Tables 2 and 3, as detailed hereafter, represent the different features of vowels and gemination consecutively. Thus, software representing such a system comprising a myriad of phonetics inevitably requires a significant allocation of memory on a computer-based device for storage of such plurality of phonetics.

A variety of software applications are available today that utilize the phonetics system to recognize the speech of human users. But, none of the prior art software utilizes an automatic speech recognition system that uses an orthographic system comprising a compact set of phonetics. Whatever the precise merits, features and advantages of the above cited references, none of them achieves or fulfills the purposes of the present invention.

SUMMARY OF THE INVENTION

The present invention provides for a method and a system for developing a compact model to transcribe the Arabic language acoustically based on a well-defined basic phonetic study. The compact model is accomplished in the present invention by reducing the set of phonemes. Thus, the creation of a minimized set of phonemes helps in reducing memory consumption, hence a fast execution of word editing. Table 4 represents the minimized set used in the dictation system. More specifically, Arabic words, provided as examples in Tables 1 and 4, illustrate that in the instance of gemination, only one grapheme (and not a doubled one) is used, while it is still doubled phonemically. It is also clear in the case of vowels; that is, while there are almost six degrees of vowels in table 1, and in table 4 there are only three. Hence, the difference in pronunciation is not taken into account in the written text. Accordingly, the present invention provides for a set of phonemes to be used by Arabic dictation software capable of automatic speech recognition.

DESCRIPTION OF THE PREFERRED EMBODIMENTS

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

One important initial step involved in the development of automatic speech recognition (ASR) software is a "basic phonetic study". A general description of such a study is starts with identifying a language on which a basic phonetic study needs to be performed, any material related to the phonology and phonetics of the identified language is collected (or alternatively extracted from a database over a network). This provides for an overview of the phonetic structure of the identified language. Furthermore, technological problems and transcription problems associated with the language are identified. For example, literature in Arabic phonetics uses the terms "emphatic", "pharyngealized", and "velarized", which exhibit clear differences that mark their uniqueness. Addtionally, it is necessary to interpret the symbols in the literature and find a mapping to a single and more recent phonetic alphabet based on feature description rather than symbol shapes.

Figure 1:
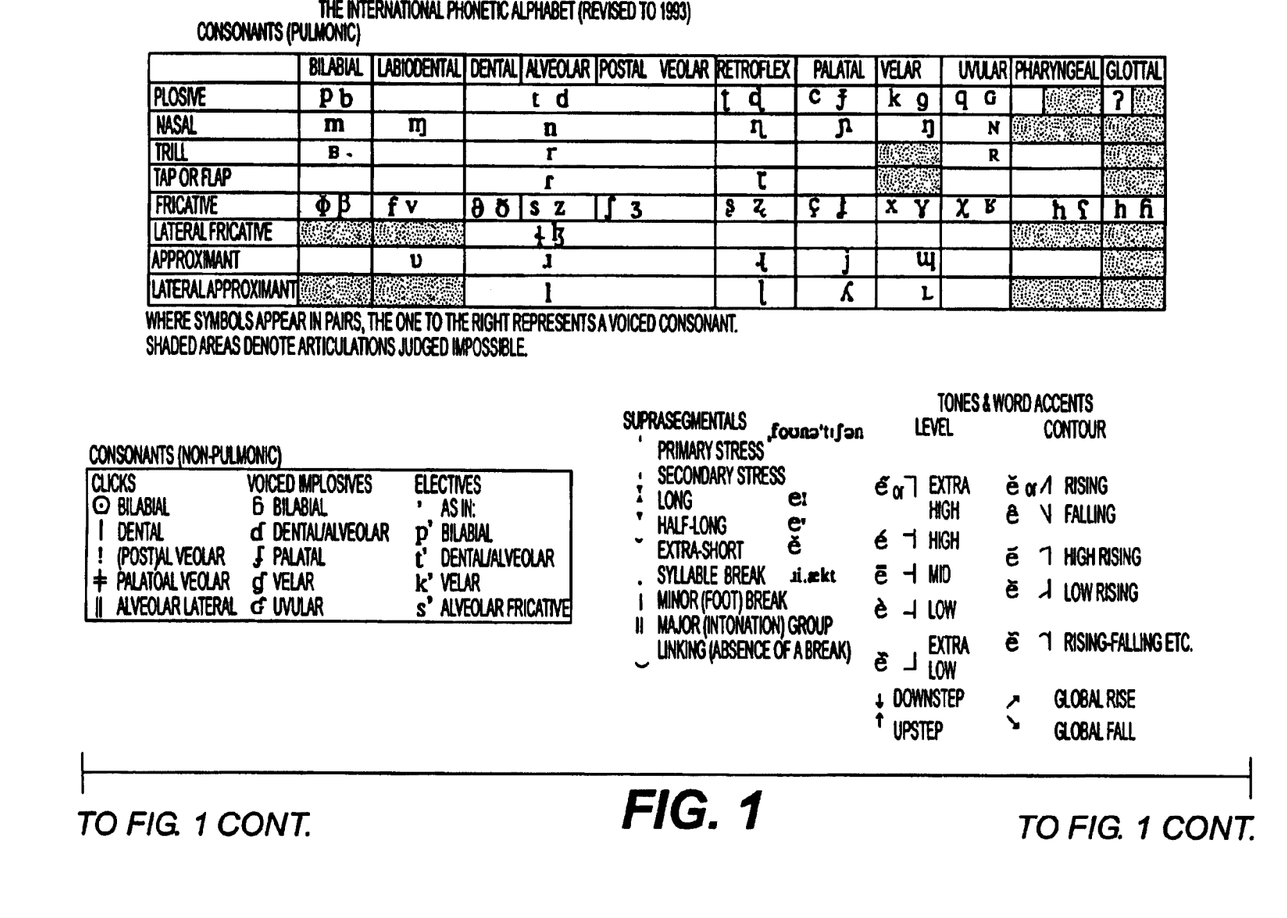
FIG. 1 illustrates the 1993 version of the International Phonetic Alphabet.

It should be noted that the International Phonetic Alphabet (IPA) was used in conjunction with this invention. The IPA, as defined by the International Phonetic Association (http://www.arts.gla.ac.uk/IPA/ipa.html) is a standard set of symbols for transcribing the sounds of spoken languages. The above mentioned website provides for a full chart of IPA symbols as reproduced in FIG. 1. Furthermore, charts for consonants, vowels, tones and accents, suprasegmentals, diacritics and other symbols are also provided. The last version of the IPA dates to 1993, as shown in FIG. 1.

In the present invention, all units regarding the literature of the language in question are collected (or alternatively extracted via a database). Next, all unwanted elements are removed. This compilation allows one to establish feature sets required to describe each and all sounds of the language, and describe accurately each phonological or phonetic unit associated with the language. After the feature set and unit transcription, a representational symbol of the transcription alphabet is selected.

Subsequently, a structured table is constructed with the following information: i) all phonemes of the language, ii) all allophones of the language and their relation to the phonemes, iii) a preliminary set of rules governing the selection of allophones, iv) a set of examples, and v) the most common representation of the sounds using Roman letters.

Figure 2:
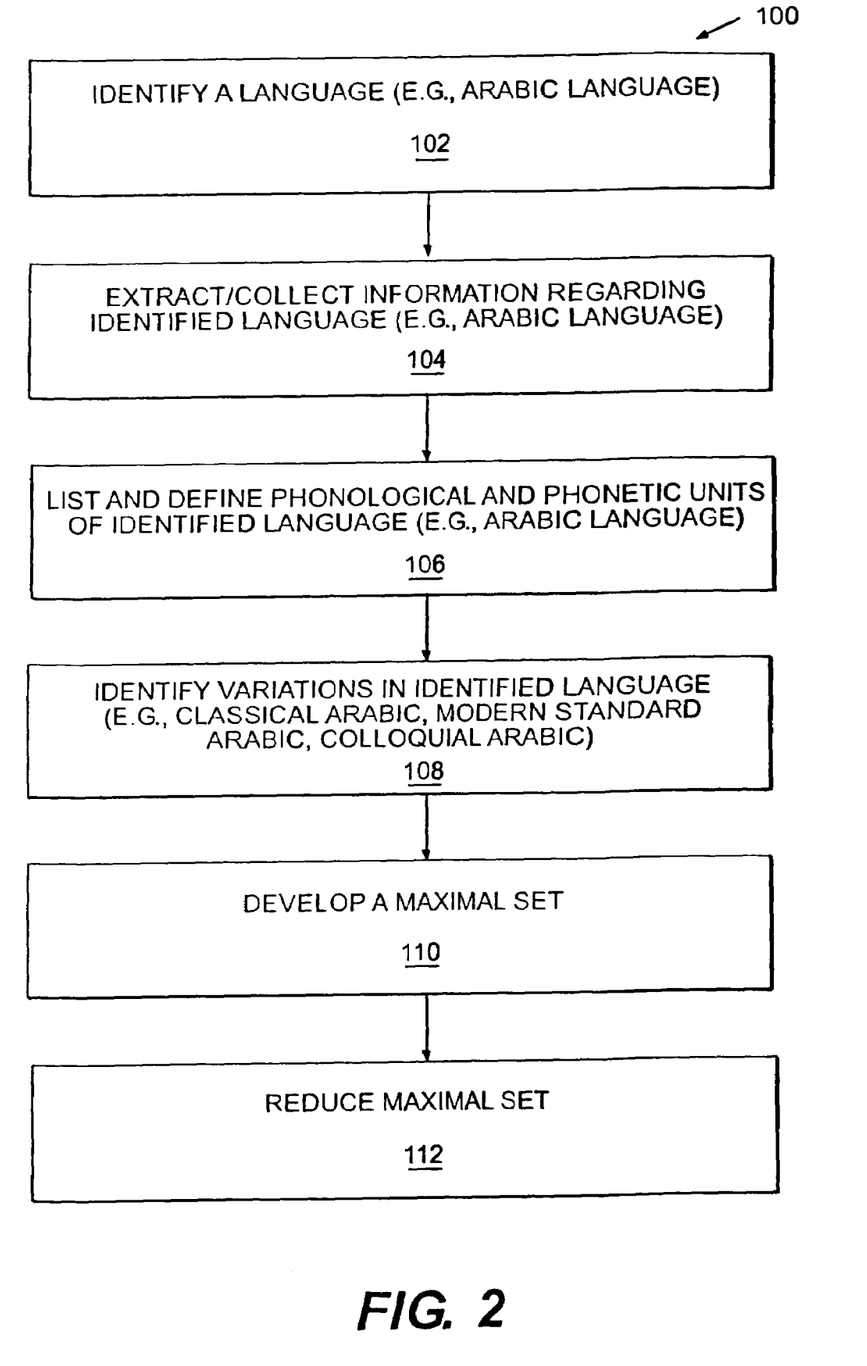
FIG. 2 illustrates the method associated with the preferred embodiment of the present invention for determining a compact model to transcribe the Arabic language acoustically based on a well-defined basic phonetic study.

FIG. 2 illustrates the method 100 associated with the preferred embodiment of the present invention for determining a compact model to transcribe the Arabic language acoustically (based on a well-defined basic phonetic study). First, a language for which a compact model is to be developed is identified 102. Next, information regarding the identified language is extracted or collected 104. Data extraction can be accomplished via a variety means including, but not limited to: extracting data regarding the Arabic language via a network (such as the Internet, Local Area Network (LAN), Wide Area Network (WAN) or database (local or remote). Next, from the extracted data, a list is created where the phonological and phonetic units are defined 106. As a next step, the variations in the Arabic language are identified 108. For example, variations in classical Arabic, Modem Standard Arabic (MSA), and colloquial Arabic are identified. Next, a maximal set is created that contains all phonemes, allophones, and transliteration symbols associated with the Arabic language 110. Transliteration refers to the process of representing or spelling a word (in a first language) in the characters of another alphabet (second language). Lastly, the maximal set is reduced 112 to provide for a compact set to transcribe the Arabic language acoustically. The details of the reduction step are explained in detail in the following sections.

Figure 3:
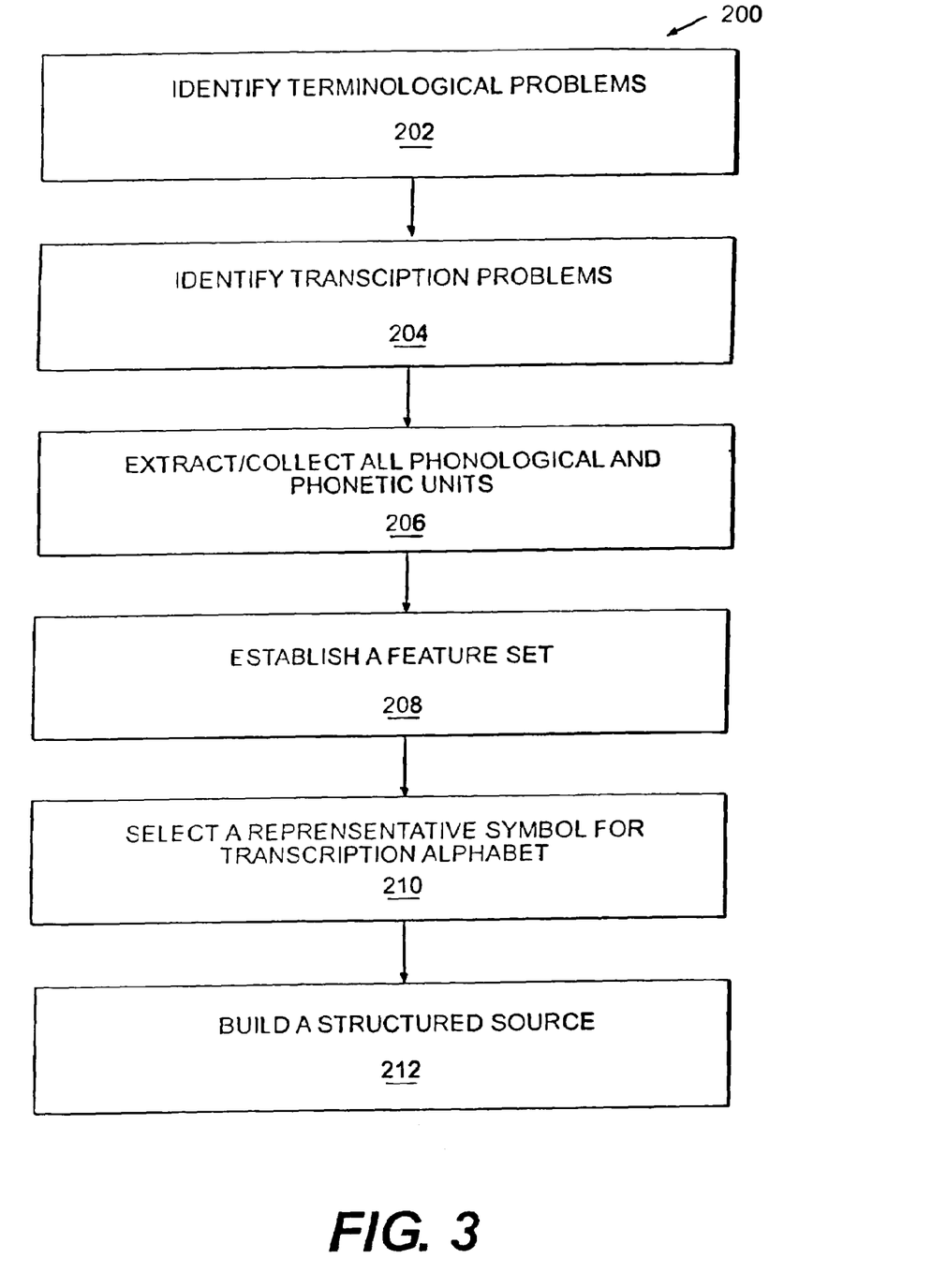
FIG. 3 illustrates in further detail the data extraction step of FIG. 2.

The data extraction step of FIG. 2 (102) is illustrated in further detail in FIG. 3. With the extracted data, terminological problems are identified 202. Certain terms that have been used by several phonological linguists in their attempt to define and describe the nature of various Arabic sounds have proved invalid; i.e. whereas few linguists may include phonemes like /F7/,/R7/, and /X/ into the category of Emphatics , others may include them in the category of pharyngeals. As a result of this non-final consensus, the most appropriate category depending upon their influence on the neighboring vowels was selected. Next, transcription problems associated with the language in question (e.g., Arabic) are identified 204. In contrast to what the IPA exhibits in using special symbols (ASCII characters) which might cause technical problems if used in the present system; the transcription set was limited to include the characters which can be typed easily on the keyboard. Furthermore, phonological and phonetic units were extracted or collected 206 and a feature set was established based on this information 208. Next, a representative symbol for the transcription alphabet is selected 210 and a structured source is built 212. Our structured source consists of Phonemes, which are divided into three main units: Consonants, Vowels and Semi-Vowels. The unit "Consonants" includes a variety of Allophones and Geminations. Aallophones may have their own gemination variety. The unit "Vowels" has a variety of allophones only, while the unit "Semi-vowel" has just gemination variety. The features of these units are determined according to three conditions: Place, manner of articulation in addition to the nature of the sound being voiced or voiceless.

Figure 4:
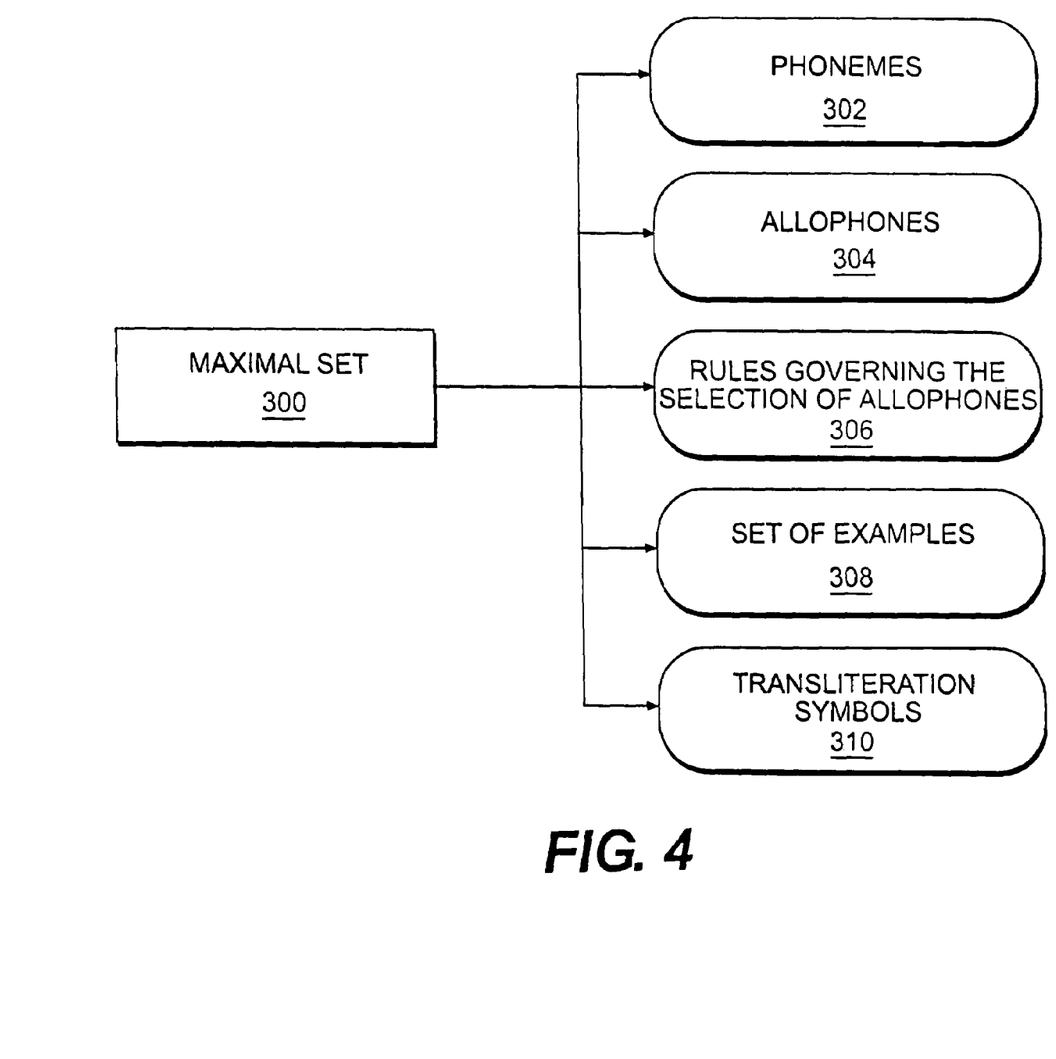
FIG. 4 illustrates the composition of the maximal set described in the method of FIG. 2.
Figure 5:
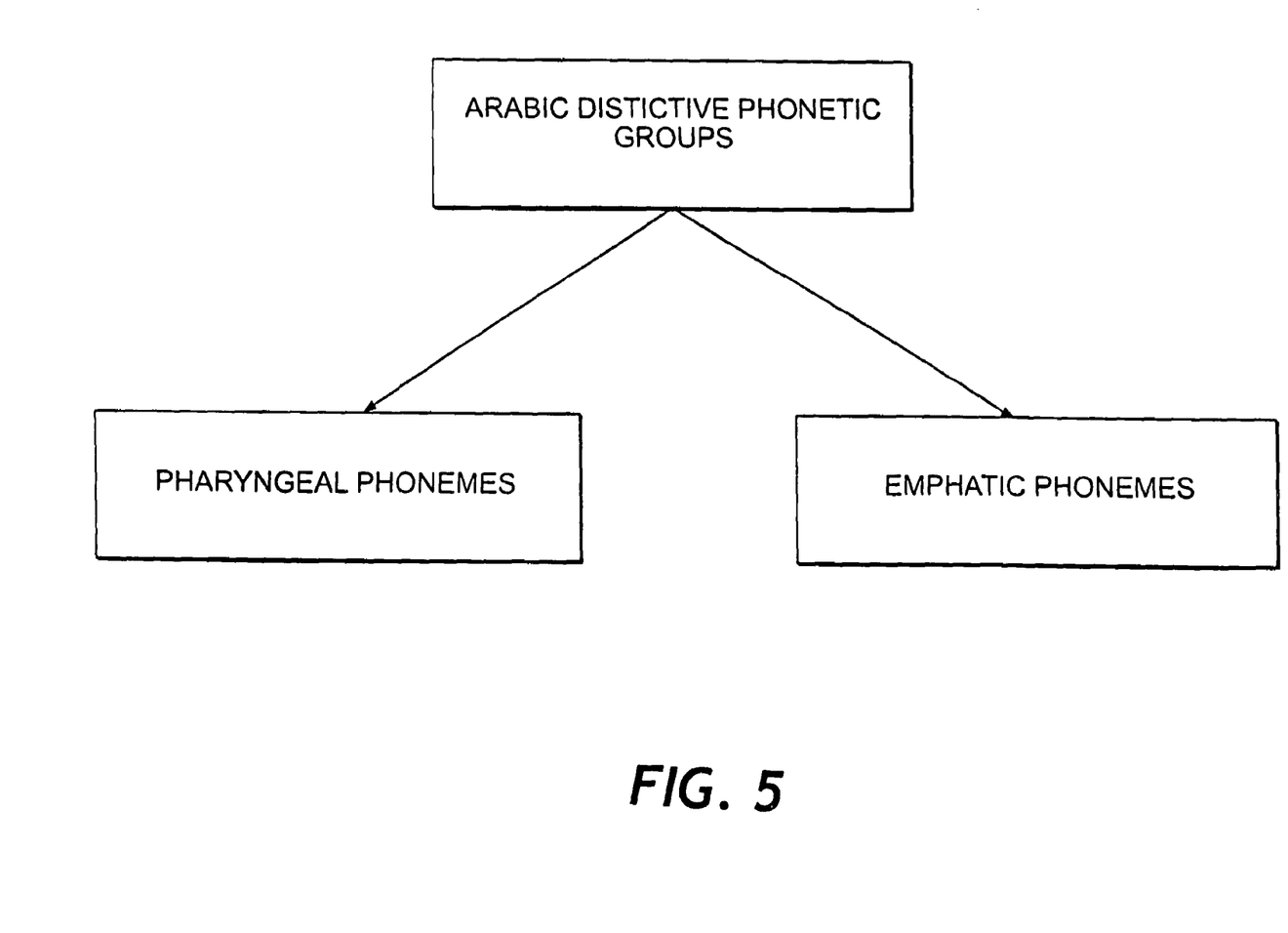
FIG. 5 illustrates the various kinds of phonemes.

FIG. 4 illustrates the composition of the maximal set described in step 110 of FIG. 2. Maximal set 300 comprises (but is not limited to): phonemes 302, allophones 304, a set of rules governing the selection of allophones 306, a set of examples 308, and the transliteration symbols 310. It should be noted that although the preferred language of this application is Arabic, one skilled in the art could extend the present invention to cover other similar languages. A detailed description of the Arabic phonetic study as per the present invention is given below.

ARABIC BASIC PHONETIC STUDY

When starting the research on basic a phonetic study for Arabic language, certain points concerning the nature of the language need to be considered. In other words, the characteristics of Arabic language at different levels (graphemic, morphological, and phonological) need to be considered. To do so, different forms of the Arabic language that can be used as an input for the text to speech (TTS) system need to be identified.

ARABIC LANGUAGE VARIETIES

We could distinguish in the Arabic language at least three varieties:
Classic Arabic
1) Language of the Holy Qur'an; highly codified since early Islamic period 2) Used nowadays only in religious sermons or speeches
Modern Standard Arabic (MSA)
  1) "Standard": Highly codified language, grammatically identical to classical Arabic, although case ending is not usually pronounced.
  2) "Modern": Lexically adapted to modern times (e.g., lexicon innovations, loan words).
Colloquial Arabic
  1) Arabic dialects: Natively learned varieties that are used in informal situations and in the everyday communication of a geographically defined community.

Since the input for the TTS system is text, it is clear that the target language for TTS should be modern standard Arabic (MSA).

Arabic Language Has Distinctive Features

Arabic letters need to be transliterated, in other words, they need to be represented by Roman alphabets in such a way that there is a one-to-one mapping between the two character systems. There is a need to not only transliterate characters, but diacritics also. Therefore, Arabic distinctive phonetic groups were created. For example, as illustrated in FIG. 4:
  1) Pharyngeal phonemes like /t % K/, /D % K/, and /d % K/ were created.
  2) Emphatic phonemes like /F7/, /R7/, and /X/ were created.

Furthermore, Arabic language has various kinds of allophones:
  1) The gemination of all consonants.
  2) Normal allophones, like pharyngealized allophones of certain consonants, and the varieties of vowels.

Finally, Arabic language has a more distinctive syllabification and lexical stress system than any other language. As a result of the basic phonetics associates with the Arabic language, a maximal set is created, that contains all phonemes, the allophones of the language, a preliminary set of rules governing the selection of allophones, a set of examples, and a transliteration symbols.

Reduction of Maximal Set

Figure 6:
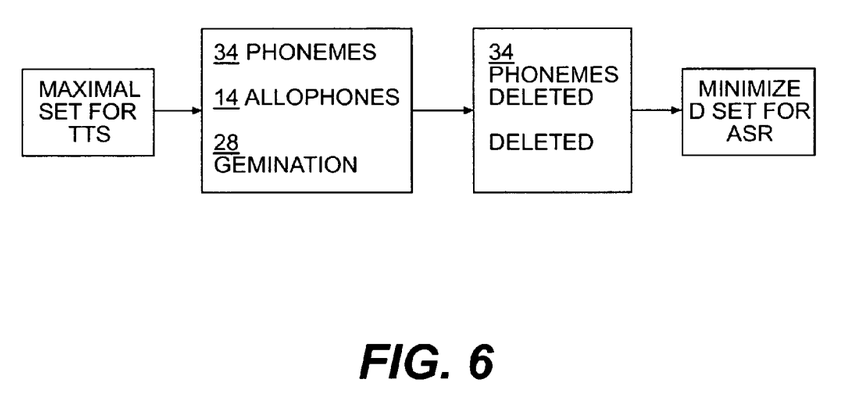
FIG. 6 illustrations the reduction of maximal set for the text to speech system and the automatic speech recognition sets in a preferred embodiment of the invention.

The reduction of maximal set for the TTS and the ASR phonetic sets are described in detail in FIG. 6.

TTS Phonetic Set

In the phonetic set for the TTS system, all the phonemes and allophones with which any given text message can be conveyed is found. For example, i) all the allophones for the vowels are identified; ii) allophones that represent any borrowed word in Arabic are identified, and iii) in the case of gemination, add symbols to represent the phoneme when it is geminated. Thus, geminated phonemes represented by doubling the original symbol, are represented by a new symbol.

ASR Set

For speech recognition, when the system recognizes the three varieties of long fatha, all of them are converted to Alif, for example, in words like /nE.0Im/, /n1.qId/ and /n2.6Ig/; the vowels E, 1, and 2 are represented by the grapheme ç. While three varieties for the short fatha will be converted into the diacritic fatha, for example, in words like /ge.le.se/, /fa.qad/ and /qAws/; the vowels e, a, and A are not represented in orthography. Both the geminated and non-geminated consonant will be represented by the same grapheme.

Only few allophones are added to recognize certain pronunciation varieties due to the country that the speech recognition system is developed for. Thus, in conclusion, the automatic speech recognition (ASR) set is less in number than the text to speech (TTS) set, thereby reducing the memory consumption in the resident computer system enabling easier storage of the compact set of phonetics.

The above enhancements for a compact model to transcribe the Arabic language acoustically based on a well-defined basic phonetic study are implemented in various computing environments. For example, the present invention may be implemented on a conventional computing equipment, a multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of automatic speech recognition (ASR).

A system and method has been shown in the above embodiments for the effective implementation of an Expanding Dictation Vocabulary. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware.

TABLE 1

Arabic Phonetic Alphabet Table
The Table Supports:
1) Well Educated Pronunciation (Used in Text To Speech)
2) In the Sound Features Field
i. (+) = Voiced
ii. (−) = Voiceless

| L. Name | A. letter | Sound Features | New Alphabet | Examples | Transcription |
|---|---|---|---|---|---|
| Alif | ا | glottal plosive − | C | ابلـه | Ce.dll.le |
|  |  | epiglottal fricative + | 0 | مزن | mu.0e4.4ln |
| Ba | ب | bilabial plosive + | b | بـلـه | b1.8l.le |
|  | بّ | geminated bilabial plosive + | B | تـبـه | te.ne.Be.0e |
| Ta | ت | alveolar plosive − | t | تـهل | teh.13l |
|  | تّ | geminated alveolar plosive − | T | سـة | sl.Te |
| Tha | ث | dental fricative − | F | ثـانـيـه | Fe.mE.ni.je |
|  | ثّ | gemi¹nated dental fricative − | FF | مكـف | mu.keF.Fef |
| Jim | ج | velar plosive + | g | جـلـه | gel.se |
|  |  | alveolo-palatal fricative + | 5 |  | 5el.se |

TABLE 1-continued

Arabic Phonetic Alphabet Table
The Table Supports:
1) Well Educated Pronunciation (Used in Text To Speech)
2) In the Sound Features Field
  i. (+) = Voiced
  ii. (−) = Voiceless

| L. Name | A. letter | Sound Features | New Alphabet | Examples | Transcription |
|---|---|---|---|---|---|
| | ع | Geminated velar plosive + | G | تنغض | mu.te.Ve.Gll |
| | | | 55 | | mu.te.Ve5.5ll |
| Ha | ح | Pharyngeal fricative − | h | خضن | ha.6A.rA |
| | ح | Geminated pharyngeal fricative − | hh | مبة | Slh.ha |
| Kha | خ | uvular fricative − | x | خمسة | xem.se |
| | خ | geminated uvular fricative − | xx | تشخى | Ces.sex.xEn |
| Dal | د | alveolar plosive + | d | دم | DeVm |
| | د | geminated alveolar plosive + | D | شد | me.De |
| Dal | ذ | dental fricative + | 4 | اذن | CE.4En |
| | ذ | geminated dental fricative + | 44 | الذى | Ce4.4E.tlJ |
| Ra | ر | r flap not retroflexed + | r | رنبوس | ram.s3s |
| | | alveolar trill + | R | اقر | Ce.qA.RA |
| Za | ز | alveolar fricative + | z | زت | Zejt |
| | ز | geminated alveolar fricative + | zz | خزن | xez.ze.na |
| Sin | س | alveolar fricative − | s | سبل | se.b3l |
| | س | geminated alveolar fricative − | ss | السبت | Ces.sebt |
| Shin | ش | post alveolar fricative − | c | شركة | ce.ri.ke |
| | ش | geminated post alveolar fricative − | cc | الشواب | Cec.ce.WEf |
| Sad | ص | pharyngealised s − | S | صلى | SAl.l3 |
| | ص | geminated pharyngealised s − | SS | الصياد | CAS.SA.J1d |
| Dad | ض | pharyngealised d + | 6 | خضن | hA.6A.rA |
| | ض | geminated pharyngealised d + | 7 | فضنة | fl.7A |
| Ta | ط | pharyngealised t − | 8 | طخ | 8A.la.Ve |
| | ط | geminated pharyngealised t − | 9 | البطينة | Cel.bA.92.rl.Je |
| Za | ظ | pharyngealised dal + | Z | ظلا | ZAl.la |
| | ظ | geminated pharyngealised dal + | ZZ | الظلم | CAZ.ZA.llm |
| Ain | ع | pharyngeal fricative + | V | عرض | VAr6 |
| | ع | geminated pharyngeal fricative + | VV | ائعة | Ce.clV.Ve |
| Ghain | غ | uvular fricative + | P | الصباغة | CeS.Si.bl.Pa |
| | غ | geminated uvular fricative + | PP | وغل | te.weP.Pol |
| Fa | ف | labiodental fricative − | f | الفتل | Cel.hefl |
| | | labiodental fricative + | v | الفيزون | tl.li.vls.jOn |
| | ف | geminated labiodental fricative − | ff | استخفف | Cls.te.xef.fe |
| qaf | ق | uvular plosive − | q | قسر | QASr |
| | ق | geminated uvular plosive − | Q | حقه | ha.QA.Hu |
| kaf | ك | velar plosive − | k | كلية | kul.li.Je |
| | ك | geminated velar plosive − | K | تمكنت | te.me.Ke.net |
| lam | ل | alveolar lateral approximant + | l | لبس | ju.le.B3 |
| | ل | geminated alveolar lateral approximant + | LL | الله | CAL.L2X |
| | | geminated pharyngealised l + | ll | المصلحة | Cel.mu.sel.le.ha |
| mim | م | bilabial nasal + | m | مسد | mes.5ld |
| | م | geminated bilabial nasal + | mm | الهمة | Cel.Hem.me |
| nun | ن | alveolar nasal + | n | نم | ne.Vem |
| | | velar nasal + | N | لنكر | CaN.ka.ra |
| | ن | geminated alveolar nasal + | nn | تصنع | ta.San.na.Va |
| ha | ه | glottal fricative − | X | فخد | feXd |
| | | glottal fricative + | H | فهد | ZA.Ha.rA |
| | ه | geminated glottal fricative + | HH | توهمه | ta.weH.He.me |
| waw | و | labio-velar approximant + | W | فول | du.wel |
| | و | geminated labio-velar approximant + | W | التلوث | Ce.Te.le.WuF |
| ya | ي | palatal approximant + | j | يوم | jed.Vom |
| | ي | geminated palatal approximant + | J | التجن | Ce.Te.de.Jon |
| fatha | | open mid front | e | تغزبة | te5.rl.be |
| | | open front | a | صدقة | SA.da.qa |
| | | low back | A | قصى | qA.62 |
| kasra | | mid-high mid-front short | i | القلة | Cen.n1.qld |

TABLE 1-continued

Arabic Phonetic Alphabet Table
The Table Supports:
1) Well Educated Pronunciation (Used in Text To Speech)
2) In the Sound Features Field
  i. (+) = Voiced
  ii. (−) = Voiceless

| L. Name | A. letter Sound Features | New Alphabet | Examples | Transcription |
|---|---|---|---|---|
|  | close front | I | إِي | Ci.IE |
| damma | close back | u | لُغَات | Cum.me.HEt |
|  | open - mid back | o | الْفَرْت | Cel.Po.raf |
| alif | mid front long | E | الشَّاب | Cec.ce.bEb |
|  | open front | 1 | الحَاسِب | Cel.hE.slb |
|  | low back | 2 | تَمَنَّل | Cln.fi.S2l |
| waw | close back | U | نُدُر | te.dUr |
|  | open mid back | O | دكتور | duk.tOr |
| ya | mid-high mid-front long | Y | أبير | Cem.bYr |
|  | close front | 3 | رئيس | ra.03s |

TABLE 2

| | |
|---|---|
| wegd | وَجد |
| waqt | وَقت |
| WA6V | رَخَج |

(Different symbols that represent short Fatha)

| | |
|---|---|
| NE.0Im | نَائم |
| N1.qId | ناقِد |
| N2.6Ig | ناخِج |

(Different symbols that represent long Fatha)

TABLE 3

| | |
|---|---|
| Ben.nEC | بَنَاء |
| Ra.B3 | رَتِي |
| 8A.lab | طلب |
| CA.9A.lab | الطالب |

The invention claimed is:

1. A method for determining a compact model to transcribe a language acoustically based on well-defined basic phonetics, said method comprising:
   extracting phonetic information regarding said language;
   defining, based on said extracted information, phonological and phonetic units associated
   with said language;
   identifying variations in said language;
   developing a maximal set based on said defined phonological units, phonetic units, and identified variations in said language, and
   reducing said maximal set to a minimal set of phonemes and allophones wherein said reducing said maximal set further comprises reducing a text-to-speech phonetics set, wherein said text-to-speech phonetics set is reduced by using allophones and adding symbols representing the phoneme to be geminated, and which further comprises removing one of said phonological units, phonetic units and identified variations in said language, thereby providing for a compact model for acoustically transcribing said language.

2. A method for determining a compact model to transcribe a language acoustically based on well-defined basic phonetics, as per claim 1, wherein said step of extracting information further comprises:
   identifying terminological problems associated with said language;
   identifying transcription problems associated with said language;
   extracting all phonological and phonetic units associated with said language, and selecting a representative symbol for the transcription alphabet.

3. A method for determining a compact model to transcribe a language acoustically based on well-defined basic phonetics, as per claim 2, wherein said transcription alphabet is in compliance with the International Phonetics Alphabet (IPA).

4. A method for determining a compact model to transcribe a language acoustically based on well-defined basic phonetics, as per claim 1, wherein said maximal set comprises any of, or a combination of: phonemes, allophones, rules governing the selection of allophones, a set of examples, and transliteration symbols.

5. A method for determining a compact model to transcribe a language acoustically based on well-defined basic phonetics, as per claim 1, further including the step of reducing an automatic speech recognition phonetic set.

6. A method for determining a compact model to transcribe a language acoustically based on well-defined basic phonetics, as per claim 5, wherein said step of reducing an automatic speech recognition phonetic set further comprises the use of diacritics, graphemes, and allophones.

7. A method for determining a compact model to transcribe a language acoustically based on well-defined basic phonetics, as per claim 1, wherein said language is any of the following: modern standard Arabic (MSA), classical Arabic, or colloquial Arabic.

8. A method for determining a compact model to transcribe a language acoustically based on well-defined basic phonetics, as per claim 1, wherein said phonetic information is extracted over a network.

9. A method for determining a compact model to transcribe a language acoustically based on well-defined basic phonetics, as per claim 8, wherein said network is any of the following networks: local area networks (LAN), wide area networks (WAN), Internet, HTTP-based networks, or wireless networks.

10. A voice control system utilizing a compact model to transcribe a language acoustically based on well-defined basic phonetics, said system comprising:
   a computer system;

a microphone, said microphone interfacing with said computer system, said microphone capable of receiving voice input in said language, a multimedia kit including full duplex sound card, said multimedia kit interfacing with said computer system, and said multimedia kit receiving said voice inputs from said microphone, and said computer system receiving said voice input from said multimedia kit and phonetically analyzing said voice inputs using a stored compact set of phonetic alphabets including a text-to-speech phonetics set, wherein said text-to-speech phonetics set is reduced by using allophones and adding symbols representing the phoneme to be geminated, and from which at least one of a phonological unit, a phonetic unit, and an identified variation in said language has been removed, thereby enabling translation of voice-to-text based on said stored compact set of phonetic alphabets.

11. A voice control system utilizing a compact model to transcribe a language acoustically based on well-defined basic phonetics, as per claim 10, wherein said multimedia kit further comprises a built-in automatic speech recognition (ASR) utility.

12. A voice control system utilizing a compact model to transcribe a language acoustically based on well-defined basic phonetics, as per claim 10, wherein said multimedia kit recognizes human voice and interprets it into corresponding actions without being speaker dependent.

13. A voice control system utilizing a compact model to transcribe a language acoustically based on well-defined basic phonetics, as per claim 12, wherein said speaker dependent includes gender or age.

14. A voice control system utilizing a compact model to transcribe a language acoustically based on well-defined basic phonetics, as per claim 10, wherein said compact set of phonetic alphabets is accomplished using diacritics, graphemes, and allophones.

15. A voice control system utilizing a compact model to transcribe a language acoustically based on well-defined basic phonetics, as per claim 10, wherein said compact set of phonetic alphabets are compliant with the International Phonetics Alphabet (IPA) standard.

16. A voice control system utilizing a compact model to transcribe a language acoustically based on well-defined basic phonetics, as per claim 10, wherein said language is any of the following: modern standard Arabic, classical Arabic, or colloquial Arabic.

17. A voice control method utilizing a compact model to transcribe a language acoustically based on well-defined basic phonetics, said method comprising:

receiving voice inputs in said language via a microphone;

phonetically analyzing said received voice inputs using a computer-based system, and said computer-based system analyzing said voice input using a stored compact set of phonetic alphabets including a text-to-speech phonetics set, wherein said text-to-speech phonetics set is reduced by using allophones and adding symbols representing the phoneme to be geminated, and from which at least one of a phonological unit, a phonetic unit, and an identified variation in said language has been removed, thereby enabling translation of voice-to-text based on said stored compact set of phonetic alphabets.

18. A voice control method utilizing a compact model to transcribe a language acoustically based on well-defined basic phonetics, as per claim 17, wherein said compact set of phonetic alphabets is accomplished using diacritics, graphemes, and allophones.

* * * * *